Sept. 30, 1969  I. F. CHURCHILL ET AL  3,469,368
WRAPPING MACHINE

Filed July 20, 1967  5 Sheets-Sheet 4

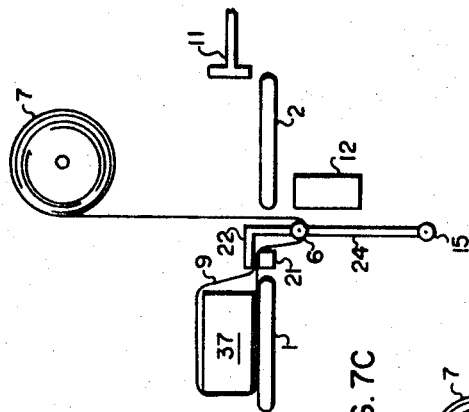
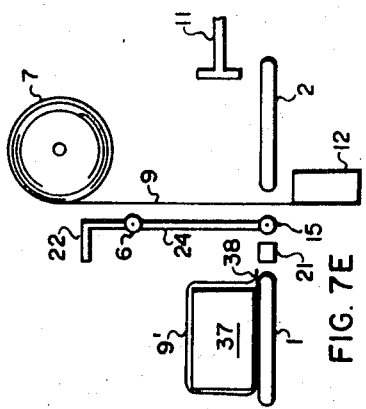
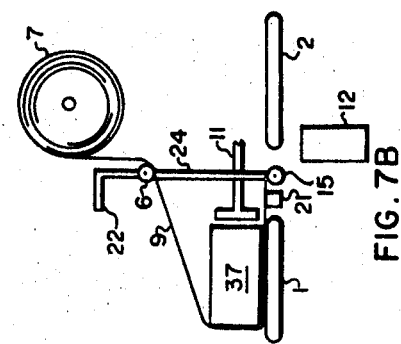
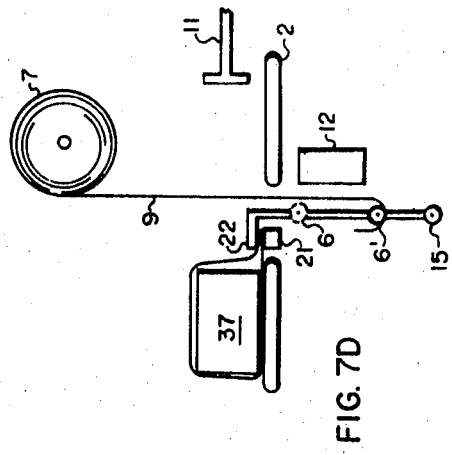
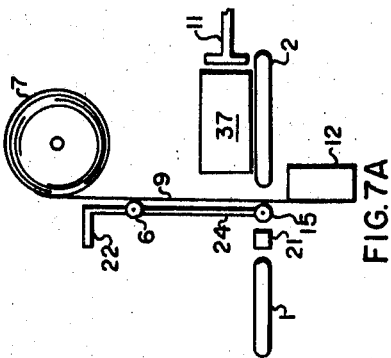

United States Patent Office 3,469,368
Patented Sept. 30, 1969

3,469,368
WRAPPING MACHINE
Ivan F. Churchill, Greenville, Homer A. Searcy, Spartanburg, and Monroe F. Taylor, Greenville, S.C., assignors to W. R. Grace & Co., Duncan, S.C., a corporation of Connecticut
Filed July 20, 1967, Ser. No. 654,868
Int. Cl. B65b 11/48, 41/12, 51/26
U.S. Cl. 53—229                                    4 Claims

ABSTRACT OF THE DISCLOSURE

A machine for sleeve wrapping articles in a single sheet of heat shrinkable thermoplastic film having means for advancing an article into a vertically disposed sheet of film to cover the leading side and bottom of the article, a stroke roller for bringing film down behind the trailing side of the article thus covering the top and trailing side and pulling additional film from a film supply, a heated ribbon for sealing the film to itself, and means for severing the film. A secondary stroke from the roller wipes the lower portion of the unsevered film against a vacuum plate to hold the film vertically in place for a succeeding article.

---

This invention relates to a machine for sleeve-wrapping articles in heat shinkable thermoplastic film. In particular, the invention relates to a machine for sleeve wrapping case goods.

Traditionally, case goods such as the twelve or twenty-four count case of canned vegetables, etc., have been packaged in paperboard boxes. Since the introduction of heat shrinkable thermoplastic film in the packaging field, the film has proven to be effective for packaging case goods. A common package is to provide a base tray onto which are assembled a dozen cans, and on top of these is placed a second tray on which a second dozen cans are arranged. These two filled trays are then sleeve-wrapped with a heat shrinkable film. Upon the application of heat the film shrinks around the can-filled trays leaving a neat, attractive package. These cases are easy to open and make an attractive display for grocery stores. Therefore, an object of the present invention is to provide a machine which can sleeve wrap case goods and other articles in heat shinkable thermoplastic film.

Another object of the present invention is to provide a wrapping machine which is more efficient and reliable than prior art machines.

A further object is to provide a machine which can sleeve-wrap an article in a single sheet of thermoplastic film.

These and other objects are achieved by the subject invention which comprises a table with first and second top surfaces that are spaced one from the other. An upright frame is positioned between the two surfaces. The frame carries a supply of sheet wrapping material above the table and is so positioned that the free end of the sheet hangs vertically between and below the surfaces. A conveyor brings an article to the second table surface where it is advanced to the first surface by a push rod or other means causing the article to engage the hanging sheet of wrapping material as it is advanced. This pulls an additional amount of wrapping material from the material supply.

A stroke roller is positioned in the upright frame so that it can move with vertically reciprocating motion. As the article is positioned on the first surface the stroke roller descends, engages the sheet of wrapping material, and upon further descent, carries the wrapping material below the surface of the table top ending its primary stroke. An additional actuating means is provided to give a secondary downward stroke to the roller to aid in severing the wrapping material and wipe it against a vacuum holding plate for the next package.

A pressure plate moves downward with and in spaced relation to the stroke roller. The pressure plate engages a sealing means provided in the first table surface and in so doing contacts both ends of the sheet of material and presses them together. A sealing means which can be an electrically heated ribbon seals the two ends of the wrapping material together. A knife edge or other means is also disposed in the first table surface and as the sealing takes place it cuts the sheet of material whose free end is then carried downward into the space between the first and second table surfaces and wiped against the vacuum plate by the secondary stroke of the roller. The stroke roller returns to its initial position and the film is now positioned so that a second article may be wrapped. The invention may be better understood by reference to the following drawings and detailed description in which:

FIGURE 7 is a schematic diagram showing the steps which the subject invention performs in sleeve wrapping an article; and, FIGURE 8 is an illustration of a sleeve wrapped package before and after being heat shrunk.

Figure 1:
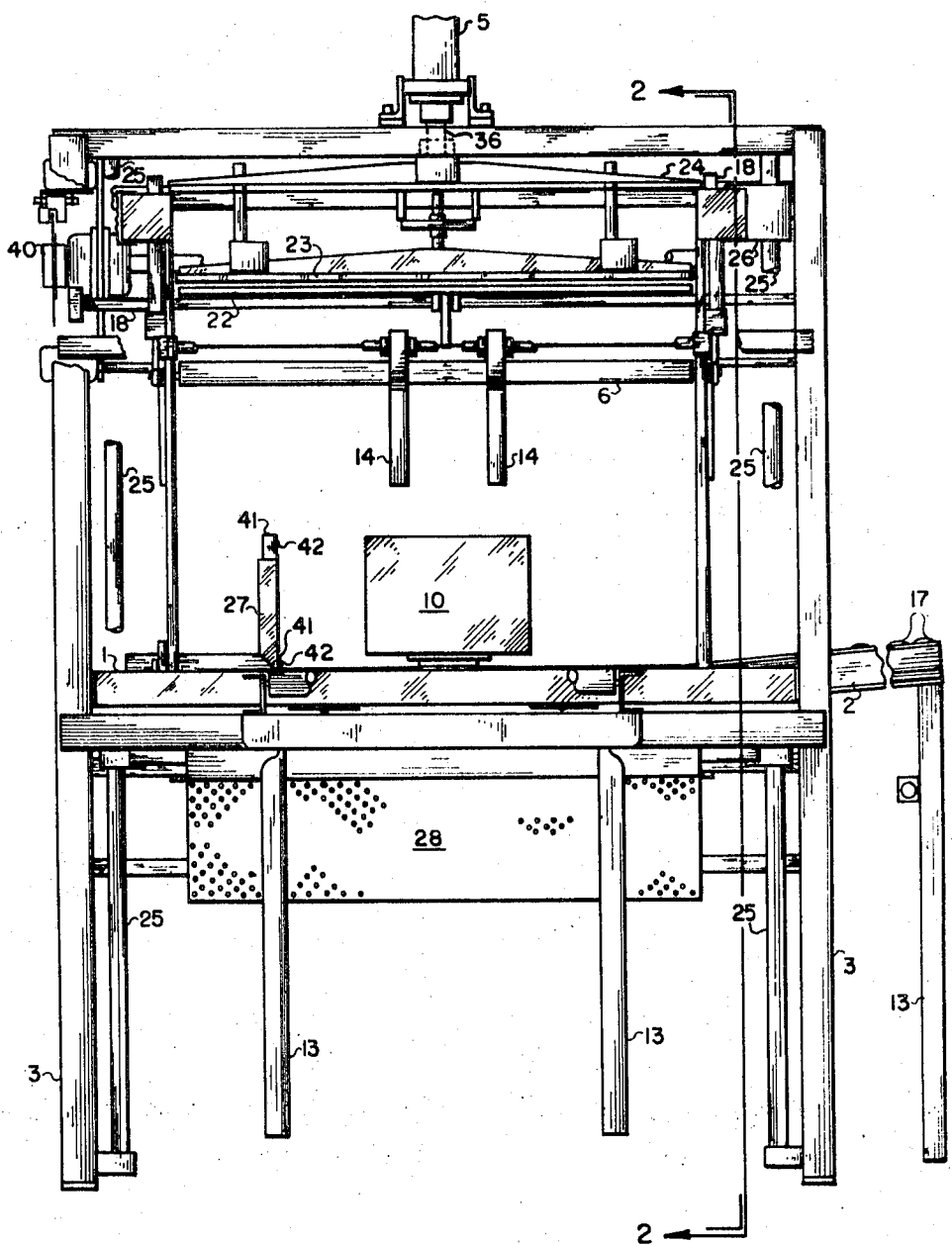
FIGURE 1 is a front elevation of the present invention.
Figure 2:
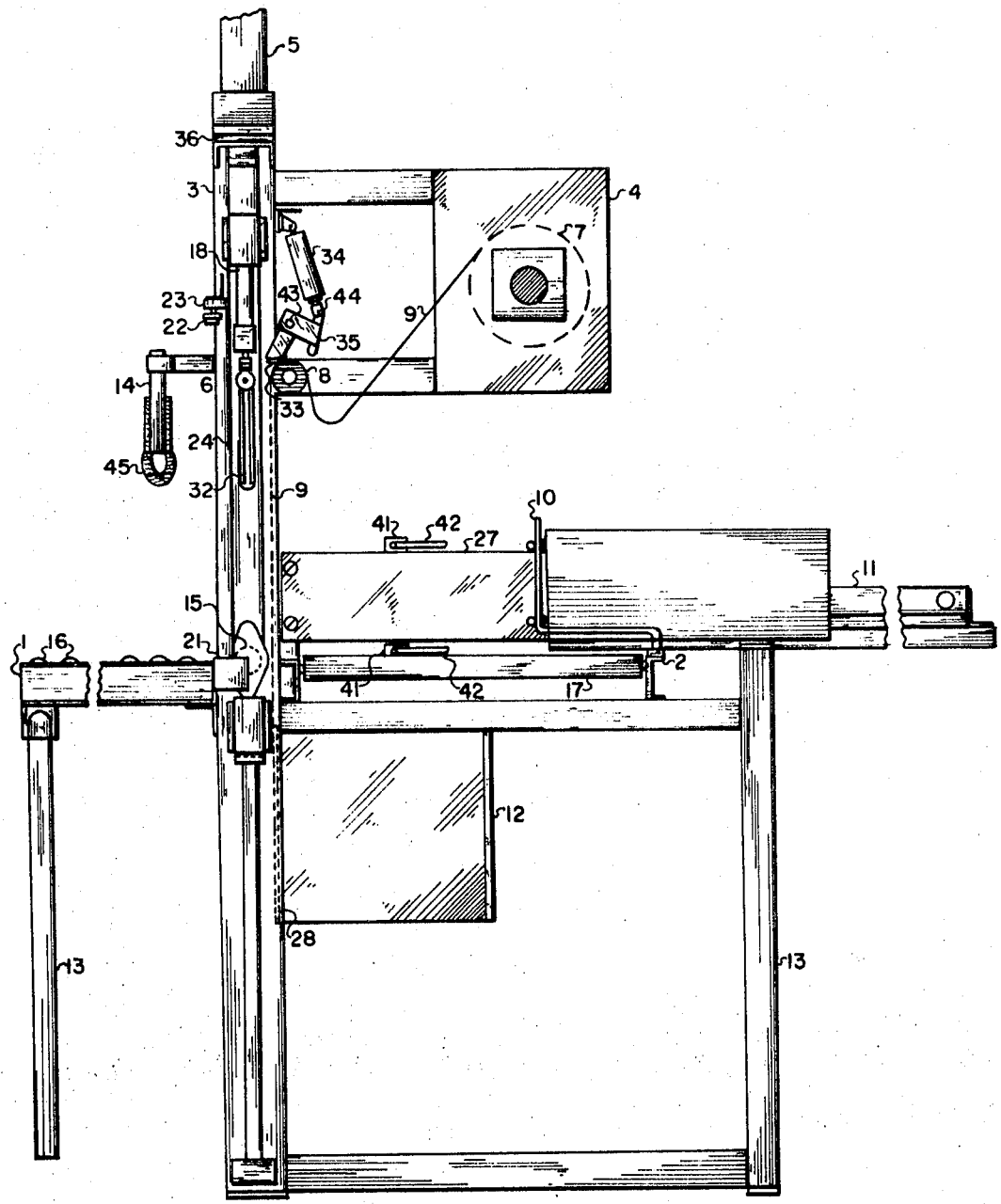
FIGURE 2 is a side elevation of the present invention partially in section as indicated by lines 2—2 of FIGURE 1.

Referring now to FIGURES 1 and 2, a table having first surface 1 and second surface 2 is shown supported by table legs 13. The surfaces are provided with rollers 16 and 17 to permit easy movement of articles thereon. A conveyor belt or other conveying means may be employed to deliver articles to the table surface 2 and to remove articles from table surface 1.

Upright frame 3 is positioned between the two table surfaces 1 and 2 leaving a free space between the two surfaces. A movable carriage 24 is mounted for vertical reciprocal motion within the frame. The movable carriage has guide sleeves 26 attached thereto and these sleeves fit around guide shafts 25 which insure true vertical motion of the carriage. Wrapping material guides 14 are included on the upright frame and smooth down the wrapping material as it is brought over the top of an article and permit film movement only in one direction. The guides 14 are pivotally mounted and have a looped facing material 45 which is preferably made from foamed sheet rubber.

A cylinder 5 having a pneumatically actuated piston therein is carried by the upright frame 3. The piston is not shown but connecting rod 36 connects the piston with movable carriage 24 and is the primary drive mechanism or actuating means for vertically reciprocating the carriage. A hydraulic or electromagnetic actuating means could also be used.

Figure 4:
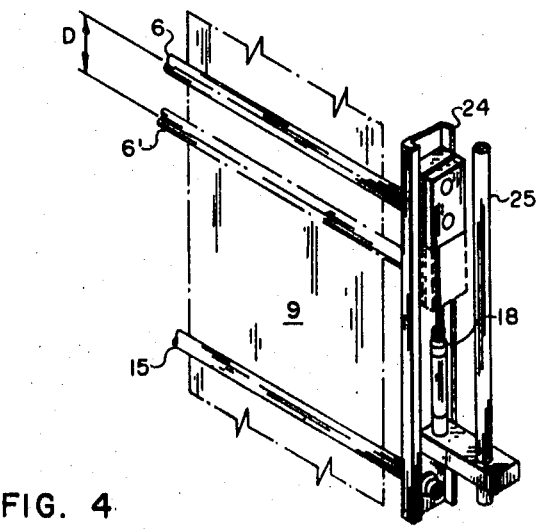
FIGURE 4 is a sectional perspective showing the stroke roller and the secondary actuating means.

The horizontal stroke roller 6 is also carried in the moveable carriage 24. Pneumatic cylinders 18 with pistons therein are the secondary actuating means for the stroke roller 6 and can drive the stroke roller 6 downward relative to the carriage 24. In doing so the ends of the stroke roller move in slots 32. This movement can be seen in some detail in reference to FIGURE 4 where a pneumatic cylinder 18 is shown in position to move stroke roller 6 a distance d to new position 6'. In this instance the pneumatic cylinder 18 is located on the carriage below stroke roller 6. In FIGURES 1 and 2 it is located above the roller. Either position is operable and is within the scope of the invention.

Returning now to FIGURES 1 and 2, support roller 15 is shown mounted parallel to and below the stroke roller 6 in the moveable carriage 24. At this position the support roller 15 supports an article while moving across the space between table surfaces 1 and 2, and at the same time the roller 15 permits the lower portion of the sheet of film 9 to be smoothly applied to the bottom of an article passing thereacross.

Also included in the moveable carriage is pressure plate 22 and the supporting ledge 23. A space is left between pressure plate 22 and support ledge 23 as the plate is resiliently mounted to the ledge. The plate 22 has a facing of a soft material such as rubber. At the bottom of the downward stroke of the moveable carriage 24 pressure plate 22 will engage platen 21 and secure the wrapping material therebetween. An actuating switch (not shown) is carried by ledge 23 so that upon engagement of the platen 21, the movement of the pressure plate 22 against ledge 23 will open the switch and actuate a knife blade or heat a severing wire to cut the film as will be more fully described below. In addition to energizing the film cutting means, the actuating switch starts two timed pneumatic switches, the first of which actuates pneumatic cylinder 34 to apply film brake 33 and the second of which actuates pneumatic cylinder 18 thereby lowering the stroke roller 6 which pulls the film 9 away from the cutting means thus aiding the cutting operation and which lays or wipes the lower portion of the uncut film sheet 9 against vacuum plate 28.

Figure 6:
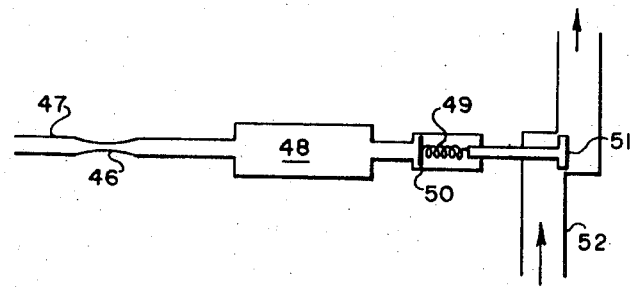
FIGURE 6 is a schematic diagram of a time delay switch used in the invention.

The pneumatic actuating switch carried on ledge 23 can be a conventional valve and the timed pneumatic switches are also conventional types having a time constant built in. Referring to FIGURE 6 it is seen that the time constant can be built in by putting a throttling restriction 46 in the pneumatic line 47 and feeding the line to a suitable tank 48. A spring loaded valve disk 50 will control the outlet to the tank and a time delay is encountered while the throttled feed line introduces sufficient air to the tank to build up the pressure necessary to overcome the resilient force of spring 49 and open valve 51 located in a main air supply line 52. The electrical equivalent of this arrangement is, of course, a resistor and capacitor in series.

The time delay is necessary so that the film brake can be applied after the film has been gathered between the pressure plate 22 and platen 21 and before the secondary stroke of the stroke roller 6.

Figure 3:
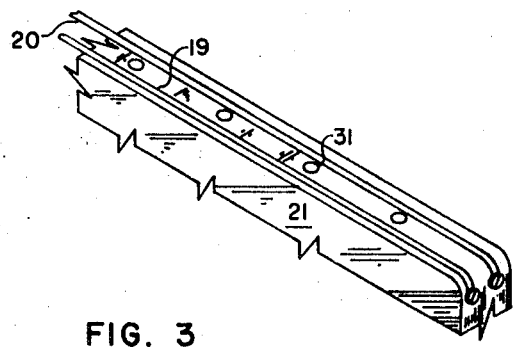
FIGURE 3 is a sectional perspective of a sealing and severing means which can be used in the present invention.

In FIGURE 3 more detail of the platen 21 may be seen. Sealing ribbon 19 is electrically resistance heated and its flat surface enables it to make good seals of the film under pressure of plate 22. Severing wire 20 is also electrically resistance heated but to a higher temperature thus enabling it to cut the film. A knife edge may be substituted in the place of the severing wire. In this event the knife edge will be serrated and can be withdrawn into the platen 21 and driven out subsequently to cut the wrapping material. Vacuum holes 31 may be included to keep the film flat and even as it is severed.

Figure 5:
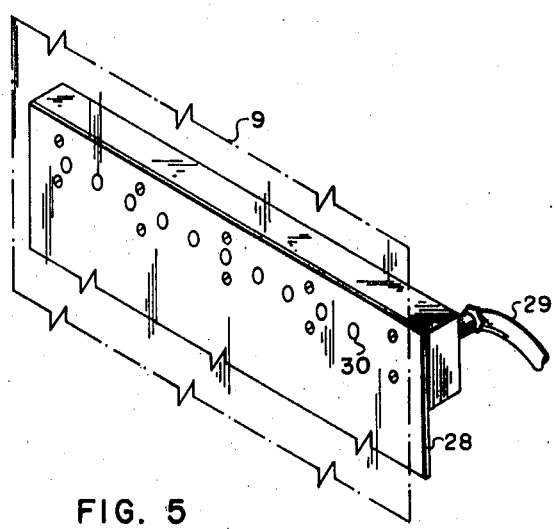
FIGURE 5 is a perspective showing the vacuum means for holding the free end of the wrapping material.

In FIGURE 5 vacuum means 12 may be seen which secures the end of the vertically hanging sheet of wrapping material 9. The means 12 consists of a vertically hanging backup plate 28 and a vacuum connection 29 which draws a vacuum through holes 30. The wrapping material 9 hangs in the space between the two table surfaces 1 and 2 and depends from roller 8 which may be seen in FIGURE 2. The wrapping material is fed from feed roll 7 which is carried by support frame 4 which in turn is attached to upright frame 3.

In most instances the wrapping material used in the present invention will be transparent, heat-shrinkable thermoplastic film although paper could be used and its edges glued together rather than being heat sealed.

The wrapping film 9 is pulled from feed roll 7 across roller 8 by the downward stroke of stroke roller 6 as will be described more fully below. In order to regulate the amount of film unrolled, pneumatic cylinder 34 is actuated as an article is advanced towards the film. The piston in cylinder 34 applies force through pivot 44 to rocker arm 35 which rotates about pivot 43. The resilient braking surface 33 which is attached to the end of rocker arm 35 will back off roller 8 when force is applied by the pneumatic cylinder 34. This permits additional film to be unrolled from roll 7. When pressure plate 22 engages platen 21 the first pneumatic timer is actuated and the piston in cylinder 34 is withdrawn thus causing the braking surface 33 to be applied to the roller 8 to prevent further feeding of film. Simultaneously, the rotation of feed roll 7 will be stopped by braking clutch 40.

The wrapping cycle is begun as an article coming in on rollers 17 in table surface 2 strikes arms 42 of switches 41 which are carried by guide plate 27. Switches 41 open the air line to pneumatic cylinder 11 or advancing means whose piston forces plate 10 against the article. The sequential operation of the machine is illustrated by FIGURES 7a to 7e where a sheet of wrapping material 9 is shown hanging from roll 7 with its free end secured by vacuum means 12. Moveable carriage 24 with pressure plate 26 and support roller 15 is shown positioned between table surfaces 1 and 2. Platen 21 and table surface 1 are also shown. In FIGURE 7b the advancing means 11 has positioned articles 37 through the space between stroke roller 6 and support roller 15 striking the film and causing the film to be wrapped around its leading and bottom sides. The trailing edge of film 9 is shown resting on platen 21. In FIGURE 7c advancing means 11 has withdrawn to its original position and moveable carriage 21 has moved downward. Stroke roller 6 has formed a loop with film roller 9 and has carried it below the surface of the table. Pressure plate 22 has engaged the film against platen 21 and the pneumatic timer switches have been actuated.

In FIGURE 7d the additional stroke of roller 6 is shown as it moves to position 6' and is nearing the bottom of this additional stroke. The film has now been severed at the pressure plate by a severing means and is being wiped against the vacuum means 12. In FIGURE 7e the completed package is shown with the film 9' completely around article 37 there being a heat seal 38 to complete the package. The free end of the film is secured by vacuum means 12.

Figure 8A:
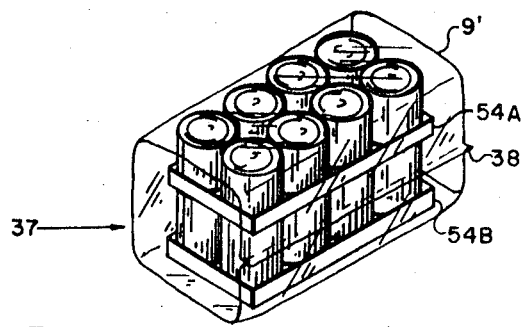
Figure 8B:
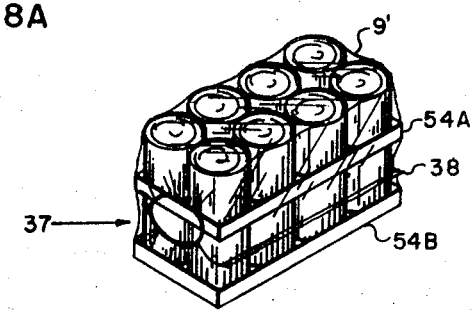

In FIGURE 8a, a double stacked case of canned goods 37 with the stacks of cans resting on paperboard trays 54a and 54b is shown over-wrapped by film 9 and sealed along edge 38. This is the appearance of a package immediately upon leaving the table surface 1. In FIGURE 8b the appearance of the package after being heat shrunk by a heat tunnel or other means is shown.

It should be noted that the invention may be easily adjusted to accommodate articles of different sizes. This is accomplished by repositioning guide plate 27 in FIGURE 1, by adjusting the distance between support roll 15 and stroke roller 6 in moveable carriage 24, by adjusting the stroke of the secondary actuating means 18, and by raising or lowering film guides 14.

Having thus described our invention we claim:

1. A machine for sleeve wrapping articles in sheet material comprising:
 (a) a table having first and second top surfaces in spaced relation one to the other;
 (b) an upright frame positioned between said first and second surfaces, said frame including means for supporting a supply of sheet wrapping material above said table whereby the free end of the sheet hangs vertically in the space between said surfaces to a distance therebelow;

(c) means for advancing an article from the second surface to the first surface of said table whereby the article engages the sheet of vertically hanging wrapping material, covers the bottom and leading side of the article, and causes additional wrapping material to be fed from said supply;

(d) a horizontal stroke roller having primary actuating means associated therewith, said stroke roller being disposed for vertically reciprocating motion within said upright frame whereby after an article has been advanced to said first surface said stroke roller upon descent will engage the sheet of wrapping material forming a loop therewith and carry the loop below the table surface;

(e) pressure means for gathering and pressing together the free end of the wrapping material with a portion of the wrapping material brought over the trailing edge of the article by the stroke roller;

(f) sealing means for sealing the gathered and pressed together portions of the wrapping material thereby forming a sleeve wrap around the article;

(g) severing means for severing the material wrapped about the article from the remainder of the film;

(h) vacuum means located beneath said second table surface and adjacent the space between the table surfaces for holding the severed end of the wrapping material thereagainst; and, (i) secondary actuating means for said stroke roller for driving the stroke roller an additional distance downward after completing the primary stroke, pulling the unsevered film down from the severing means, and wiping the severed end against said vacuum means.

2. The wrapping machine of claim 1 including vacuum means associated with said sealing means for drawing the trailing edge of the wrapping material against the sealing means thereby holding it in position for sealing.

3. The wrapping machine of claim 2 wherein the wrapping material is a heat-shrinkable thermoplastic film supplied from a roll of same.

4. The wrapping machine of claim 2 including film braking means and timed delay actuating means for applying said braking means prior to said secondary stroke.

References Cited

UNITED STATES PATENTS

| 3,078,632 | 2/1963 | Forman | 53—228 X |
| 3,248,850 | 5/1966 | Andrews et al. | 53—228 |

THERON E. CONDON, Primary Examiner

NEIL ABRAMS, Assistant Examiner

U.S. Cl. X.R.

53—182, 389